US007840499B2

(12) United States Patent  
Crutchfield

(10) Patent No.: US 7,840,499 B2
(45) Date of Patent: Nov. 23, 2010

(54) OUTBOUND DOCUMENT SYSTEM AND METHOD

(76) Inventor: Charles Westray Crutchfield, 109 Waxwood La., Cary, NC (US) 27511-9732

( * ) Notice: Subject to any disclaimer, the term of this patent is extended or adjusted under 35 U.S.C. 154(b) by 504 days.

(21) Appl. No.: 11/522,320

(22) Filed: Sep. 18, 2006

(65) Prior Publication Data

US 2008/0071558 A1    Mar. 20, 2008

(51) Int. Cl.
G06F 17/00        (2006.01)
(52) U.S. Cl. ...................................... 705/408; 705/402
(58) Field of Classification Search ................... 283/31, 283/81
See application file for complete search history.

(56) References Cited

U.S. PATENT DOCUMENTS

| 5,501,393 | A |   | 3/1996  | Walz |
| 5,836,617 | A | * | 11/1998 | Beaudoin et al. ............. 283/67 |
| 5,848,810 | A | * | 12/1998 | Beaudoin et al. ............. 283/67 |
| 5,967,558 | A |   | 10/1999 | Petkovsek |
| 5,978,781 | A |   | 11/1999 | Sansone |
| 6,010,156 | A | * | 1/2000  | Block ............................ 281/2 |
| 6,089,613 | A |   | 7/2000  | Petkovsek |
| 6,135,292 | A |   | 10/2000 | Pettner |
| 6,241,844 | B1|   | 6/2001  | Petkovsek |
| 6,361,077 | B1|   | 3/2002  | Petkovsek |
| 6,371,521 | B1| * | 4/2002  | Petkovsek ..................... 283/67 |
| 6,471,044 | B1|   | 10/2002 | Isaacs et al. |
| 6,692,033 | B2| * | 2/2004  | Miller et al. ................. 283/116 |
| 7,344,134 | B1| * | 3/2008  | Keane et al. ................. 271/178 |
| 7,458,612 | B1|   | 12/2008 | Bennett |
| 2003/0182155 | A1 |   | 9/2003  | Nitzan et al. |
| 2006/0089883 | A1 |   | 4/2006  | Peoples |
| 2008/0294474 | A1 | * | 11/2008 | Furka ............................ 705/7 |

OTHER PUBLICATIONS

Website: http://www.yourfirstprioritypackage.com/Domestic Mail Manual (DMM): S918 Delivery Confirmation.
Domestic Mail Manual (DMM): S919 Signature Confirmation
Domestic Mail Manual (DMM), Issue 58: S919 Signature Confirmation (Updated Jan. 6, 2005).
U.S. Postal Service First-Class Mail (3 pages) UMTE States Postal Servile.
Domestic Mail Manual: Section 503—"Additional Services, Extra Services".

* cited by examiner

Primary Examiner—Igor Borissov
(74) Attorney, Agent, or Firm—Ked & Associates LLP

(57) ABSTRACT

A computer-based system and method enables an item to be mailed by providing a web site offering access to a mail delivery program, receiving a request for delivering the item with Extra service status, printing an identification number and a postage mark using the program based on address, postage, and other information entered by a customer, and sending an electronic data transmission to a postal service server informing the postal service that the identification number corresponds to the Extra service request. When the postal service receives the item, it accesses its computer records to locate the identification number. Delivery is then performed based on one or more Extra services requested and a corresponding electronic return receipt is made accessible to the mailing party, either by e-mail or on a web site. The postage mark and identification number may be printed on a label affixed to the item or may be printed directly on the item along with other information.

10 Claims, 13 Drawing Sheets

1
US POSTAGE AND FEES PAID
* SAMPLE *
Mailed from ZIP 27511
1 oz First Class Rate
Zone 3 NON-MACH
*VOID - DO NOT MAIL*
FakeDeviceID
USPS FIRST CLASS
ADS
Charles Crutchfield
109 Waxwood Lane
Cary NC 27511
VOID - DO NOT MAIL
SHIP TO: Fleshner & Kim, LLP
Sam Nitiros
2325 DULLES CORNER BLVD STE 1100
2325 Dulles Corner Blvd.
HERNDON VA 20171-4691
e/ USPS DELIVERY CONFIRM
9122 1234 5678 9123 4567 83
ELECTRONIC RATE APPROVED #806213907
FIG. 1

Date: 12/15/2005

Charles Crutchfield:

The following is in response to your 12/15/2005 request for delivery information on your Certified item number 7113 3701 5370 6784 4025. The delivery record shows that this item was delivered on 11/10/2005 at 11:55 AM in RALEIGH, NC 27609. The scanned image of the recipient information is provided below.

Signature of Recipient:

Address of Recipient:

Thank you for selecting the Postal Service for your mailing needs. If you require additional assistance, please contact your local Post Office or postal representative.

Sincerely,

United States Postal Service

FIG. 2

ADS
Charles Crutchfield
109 Waxwood Lane
Cary NC 27511
US POSTAGE AND FEES PAID
* SAMPLE *
Mailed from ZIP 27511
1 oz First Class Rate
Zone 3 (no surcharge)
*VOID - DO NOT MAIL*
FakeDeviceID
VOID - DO NOT MAIL
Fleshner & Kim, LLP
Sam Nitiros
2325 DULLES CORNER BLVD STE 1100
2325 Dulles Corner Blvd.
HERNDON VA 20171-4691
CERTIFIED MAIL
e/ USPS RETURN RECEIPT
7112 3456 7891 2345 6787
FIG. 3

1
US POSTAGE AND FEES PAID
* SAMPLE *
Mailed from ZIP 27511
1 oz First Class Rate
Zone 3 NON-MACH
*VOID - DO NOT MAIL*
endicia.com
FakeDeviceID
USPS FIRST CLASS
ADS
Charles Crutchfield
109 Waxwood Lane
Cary NC 27511
VOID - DO NOT MAIL
SHIP TO: Fleshner & Kim, LLP
Sam Nitiros
2325 DULLES CORNER BLVD STE 1100
2325 Dulles Corner Blvd.
HERNDON VA 20171-4691
e/ USPS SIGNATURE CONFIRM
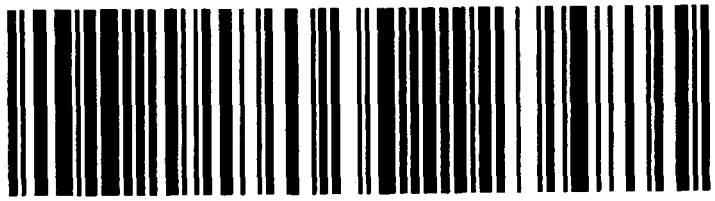
9122 1234 5678 9123 4567 83
ELECTRONIC RATE APPROVED #806213907
FIG. 4

ADS docutrail
Outbound Document Management System
Retrieve Proof of Delivery (Return Receipt) Electronic

OUTBOUND DOCUMENT SYSTEM AND METHOD

BACKGROUND OF THE INVENTION

1. Field of the Invention

This invention generally relates to the delivery of letters, packages, parcels, and/or other items of mail through the U.S. Postal Service.

2. Description of the Related Art

First Class Mail has proven to be the preferred type of mail for many postal customers. On average, it will take about three days for a First Class letter to be delivered. This is an acceptable period of time for most purposes. First Class Mail is also more private than other classes of mail. Consequently, invoices, financial statements, personal data, and confidential information is routinely delivered First Class. Post offices also give this type of mail preferential treatment, for example, by providing forwarding and return services for letters sent to wrong or moved addresses at no charge.

The U.S. Postal Service also offers customers several "extra services" for mail that qualifies as First Class. These services include Delivery Confirmation and Signature Confirmation. The Delivery Confirmation service provides the sender with information about the date and time an item was delivered and, if delivery was attempted but unsuccessful, the date and time of the delivery attempt. The Signature Confirmation service provides the sender with the same information as the Delivery Confirmation service, and additionally keeps a record of each recipient's signature which is available upon request.

While delivery and signature confirmation services have been available for some time, the current state of the art does not provide mailing customers with an efficient method of generating labels containing postage and extra service requests, which labels can be used by the postal service as a quick and convenient way of delivering items with special status.

SUMMARY OF THE INVENTION

An objective of the present invention is to provide an improved way of securing the delivery of letters, packages, parcels, and/or other items of mail through the U.S. Postal Service.

Another objective of the present invention is to secure that delivery through the generation of a mailing label which contains a postage mark and which has been designated for delivery with Extra service status.

Another objective of the present invention is to send the U.S. Postal Service an electronic data transmission indicating that an item or tracking number on the label has Extra service status, the Postal Service then identifying and then delivering the mail item based on the item or tracking number.

Another objective of the present invention is to provide a return receipt which confirms that the item has been delivered in compliance with the Extra service, which receipt may be sent, for example, electronically to a predetermined e-mail address or website.

Another objective of the present invention is to secure the delivery of a mail item by printing a postage mark and an item or tracking number directly on an envelope and then designating the number as having Extra service status for handling by the U.S. Postal Service.

Another objective of the present invention is to generate an e/Certified Mail Label with a request for an electronic USPS Return Receipt containing a First Class postage mark, wherein the Certified Mail status and return receipt request is shown on the label with the electronic return receipt request.

Another objective of the present invention is to secure the delivery of a mail item by printing a postage mark and an item or tracking number directly on a plain-paper insert which visibly displays the printed mark and number through a window of an envelope, and then designating the number as having Extra service status for handling by the U.S. Postal Service.

Another objective of the present invention is to provide an interactive web site that allows customers to enter information for automatically generating a mailing label, or for printing label information directly on an envelope or plain-paper insert, having one or more of the features discussed herein, which web site is preferably secure and subject to access through an authorized password or customer account.

Another objective of the present invention is to implement the method in software, which software may be an application program executed on a computer or software provided in association with the aforementioned web site and a client-computer web browser.

These and other objects and advantages of the present invention are achieved by providing a method which enables an item to be mailed with Extra service status. In accordance with one embodiment, the method includes providing a web site offering access to a mail delivery program, receiving address and postage information and a request for delivering the item with a extra service status, and then printing an identification number and a postage mark either on a label or directly on the item itself using the program.

An electronic data transmission is then sent to a postal service server to inform the service that the item number corresponds to the extra service request. Delivery is then carried out in satisfaction of the request, and optionally an electronic return receipt is made available to the mailing party for his records. According to one alternative embodiment, the identification number and postage mark are printed on paper to be included in an envelope containing a window.

In accordance with another embodiment, the present invention provides a data processing system which performs all or a portion of the steps of the aforementioned method. The system may include a computer running an application program which is stored, for example, on a server of a third-party interactive website. Alternatively, the system may be a stand-alone computer system running application software implemented in a home or office setting.

In accordance with another embodiment, the present invention is a mailing label comprising a postage mark and information designating that an item attached to the label is to be delivered with Extra service status. The postage mark may be indicative of a First Class or other mailing rate, and the Extra service status information may correspond to a bar code, an identification (e.g., item or tracking) number, or both. If an identification number is included on the label, a prefix code may be embedded in the identification number as a way of informing a postal service that a mail item containing the label is to be delivered with a specific type of Extra service status. The label may be generated in print or electronic form, and may include information indicative of a sum of money that includes a postage value corresponding to the postage mark and a Extra service delivery fee.

BRIEF DESCRIPTION OF THE DRAWINGS

FIG. 1 is a diagram showing a mailing label generated in accordance with a first embodiment of the present invention.

FIG. 2 is a diagram showing an example of a return receipt which may be supplied to a mailing party in accordance with the present invention.

FIG. 3 is a diagram showing a mailing label generated in accordance with another embodiment of the present invention.

FIG. 4 is a diagram showing a mailing label generated in accordance with another embodiment of the present invention.

DETAILED DESCRIPTION OF THE PREFERRED EMBODIMENTS

Figure 5:
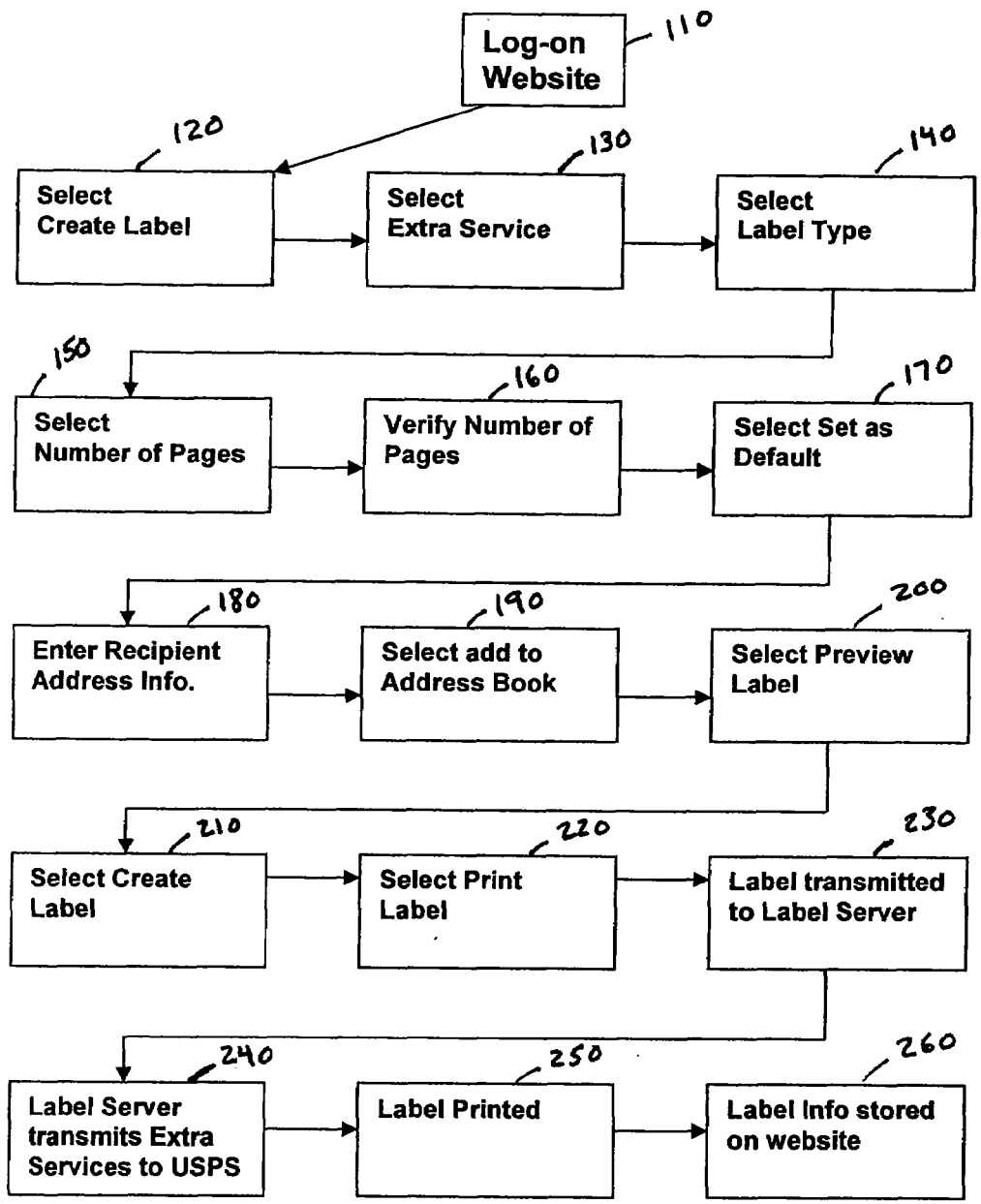
FIG. 5 is a diagram showing steps included in a method for generating a mailing label using an interactive program and/or web site in accordance with one embodiment of the present invention.
Figure 6A:
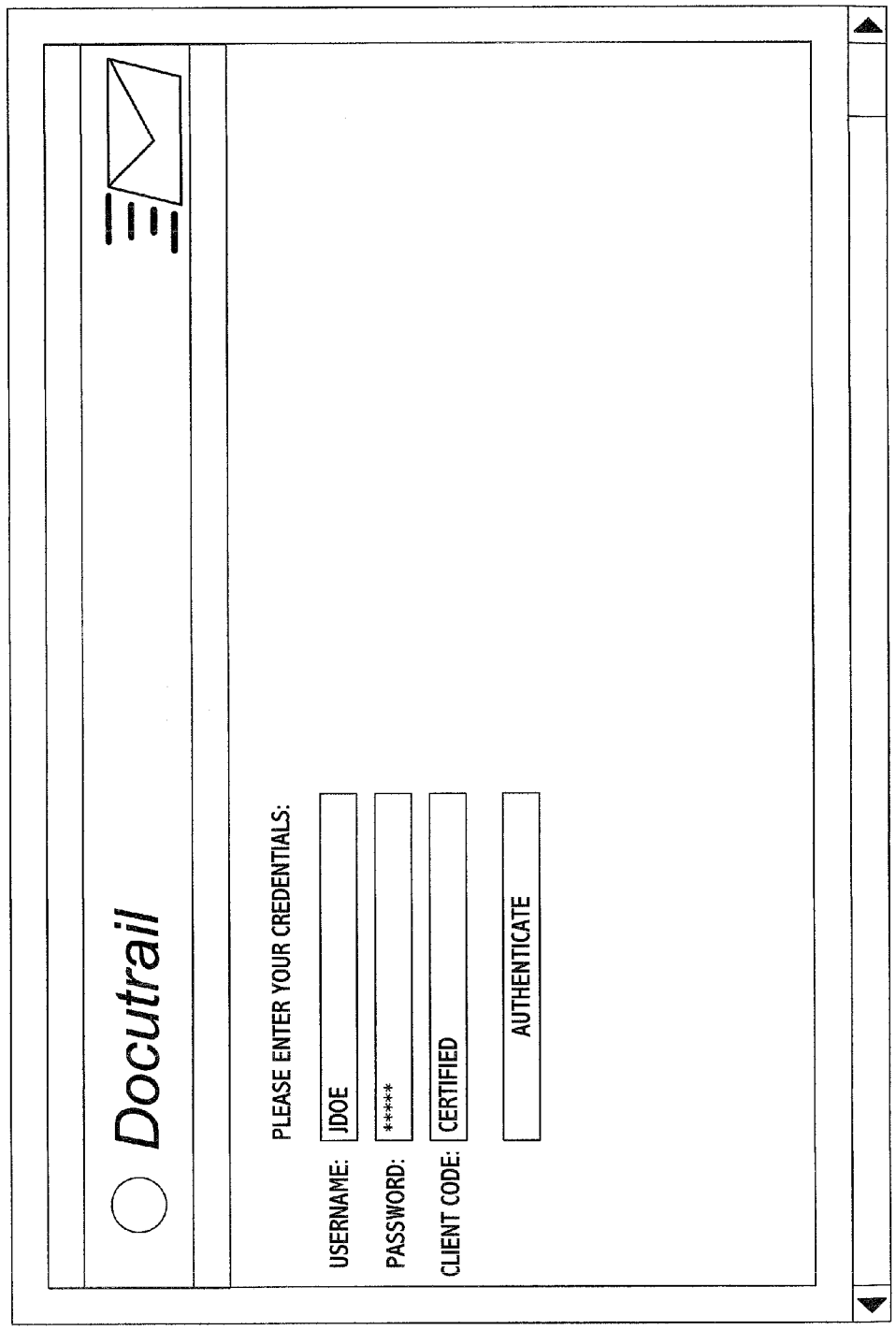
FIG. 6 (a) is a diagram showing an example of a first screen that may be generated at a web site in accordance with one embodiment of the present invention, FIG. 6 (b) shows an example of a second screen that may be generated at the web site, FIG. 6 (c) shows an example of a third screen that may be generated at the web site, and FIG. 6 (d) shows an example of a fourth screen that may be generated at the web site.
Figure 6B:
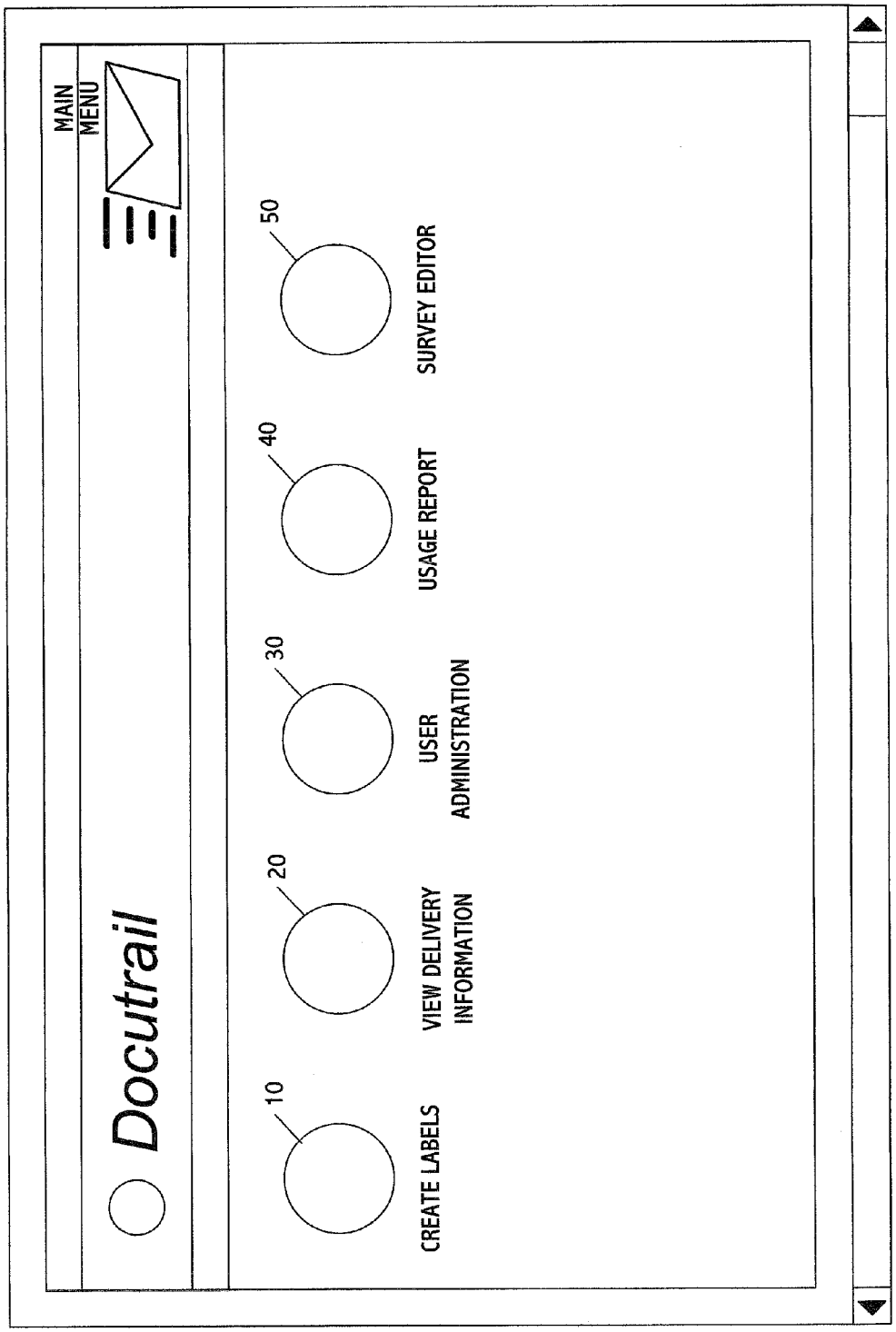
Figure 6C:
Figure 6D:
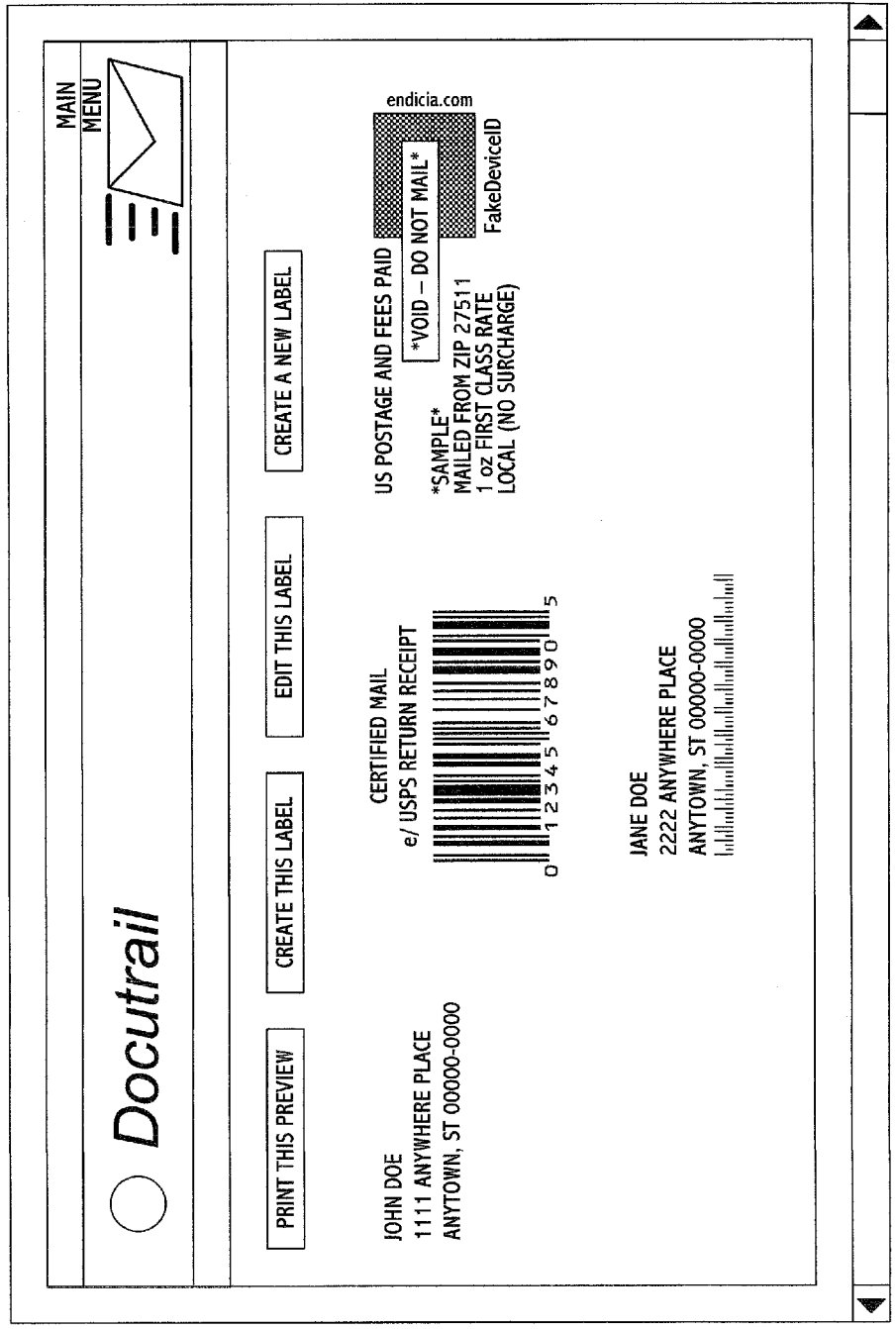

Referring to FIG. 1, a mailing label in accordance with one embodiment of the present invention includes at least two features: (1) a postage mark 1 for a predetermined class of mail and (2) identification information 2 indicating that a mail item is to be sent with Extra service status. This label is preferably generated using an interactive program which will be discussed in greater detail below.

The postage mark may be any mark accepted by the U.S. Postal Service including a two-dimensional maxicode (shown), a bar code, and/or other indicia. One preferred type of postage mark that may be used is the Endicia mark provided by PSI Systems. This mark may be printed on a predetermined area of the label along with other information to be included on the label. The amount of postage may be separately determined and entered into the program used to generate the label. The postage mark may correspond to any class of mail desired.

In accordance with one particularly advantageous embodiment, the postage mark may correspond to First-Class mail with a designation of the same printed on the label. For example, to designate First-Class mail, the label may include the numeral "1" printed on the label and/or the words "First Class Rate" printed adjacent the postage mark. The words "USPS FIRST CLASS" may also be printed in larger letters on the label. First-Class mail is preferable as many forms of mail requiring signature and/or delivery confirmation are sent in this manner.

Additional information may also be included on the label in association with the postage mark. This information may include, for example, the name of the mailing party and/or his or her address (e.g., "Mailed from ZIP 27511"), the weight corresponding to the First-Class rate (e.g., "1 oz. First Class Rate), and the mailing zone with surcharge information, e.g., Zone 3 (no surcharge). While this information is included in an area adjacent the postage mark, those skilled in the art can appreciate that this information may be printed in other areas of the label. Also, the label may include a designation indicating that postage has been paid along with any applicable fees (e.g., "US Postage Paid and Fees Paid), in association with the postage mark. These fees may include, for example, a charge for certified delivery, a charge for obtaining a return receipt, and/or other changes including any one or more of the Extra service fees discussed in greater detail below.

The identification information 2, which indicates that a mail item is to be sent with Extra service status, is also printed on the label. The identification information may be in descriptive form and/or may be encoded into an item or tracking number printed on the label. When provided in descriptive form, the identification information may include, for example, certain text indicating the type of Extra service (e.g., "Extra service: Certified Mail e/USPS Return Receipt") requested by a mailing party.

When in encoded form, the identification information may be included in or discernable from an item or tracking number printed on the label. An example of such a number 3 is shown in FIG. 1 along with a corresponding bar code 4. In this example, the prefix code "91" in the number may designate a specific type of Extra service. Other services may be designated, for example, by the prefix code "71." When the number is read by a bar code reader or is otherwise identified, the U.S. Postal Service will be able to identify that a mailing item containing the label is to be delivered with a specific type of Extra service. The item or tracking number may also be used as a basis for determining the location and status of the item during the delivery process, e.g., a mailing party may enter this number on the web site of a third-party business or the postal service in order to determine status.

The Extra service identified on the label may correspond to any one or more of the "Extra Services" identified in the Domestic Mail Manual, including but not limited to:

Certificate of Mailing
Certified Mail
Collect on Delivery (COD)
Delivery Confirmation
Express Mail Insurance
Insured Mail
Registered Mail
Restricted Delivery
Return Receipt (by mail or electronically)
Return Receipt for Merchandise
Signature Confirmation
Special Handling Those skilled in the art understand the meaning of these services, but for a more in-depth description see, for example, Section 503 of the Domestic Mail Manual, the contents of which are incorporated herein by reference. Additional Special or Extra Services may correspond to any service offered by a public or private carrier for which a fee is charged in addition to postage. Moreover, one or more Extra services may be combined in the label-based or direct-printing embodiments of the present invention, the latter of which is described in greater detail below. The combination of these services may or may not be printed consistent with these embodiments.

Three extra services which have proven to be particularly advantageous are Delivery Confirmation, Signature Confirmation and Certified Mail. The Delivery Confirmation service is described in Domestic Mail Manual (DMM), Section 503.9, entitled "Delivery Confirmation," the contents of which are incorporated herein by reference. The Certified Mail service is described in DMM, Section 503.3 The signature confirmation service is described in DMM, Section 503.10, entitled "Signature Confirmation," the contents of which are also incorporated herein by reference. These extra services are highly desirable, for example, when sending legal documents (e.g., subpoenas, service of process, etc.) or when sending time-sensitive documents where delivery and/or signature confirmation is required. The identification information of the present invention may also designate a combination of these services, e.g., Certified Mail with Return Receipt (Electronic) of First Class with Signature Confirmation.

Delivery and signature confirmation services are provided by the U.S. Postal Service for items of mail that qualify as First Class Mail under the postal guidelines and which also satisfy the requirements specified in Sections 503.9 and 503.10. These sections commonly require, for example, non-machinable parcels to be greater than ¾ inch at their thickest point. The fee for the Extra service delivery may be incorporated within the total amount corresponding to postage mark 1. This may be evident from the words "Fees Paid" in area 10 of the label. The total amount (postage+extra service fee) may also be printed on the label.

In addition to the aforementioned information, the label of the present invention may also include an area 5 for designating the addressor and an area 6 for designating the addressee. The inclusion of this information makes the label complete, e.g., all information required for mail delivery is included on the label.

When processed by the U.S. Postal Service, the Extra service requested may be accompanied by a request for sending the mailing party a return receipt confirming that the Extra service has been performed. This request may be implied by the mere designation of the Extra service or a request designation may be printed on the label. The return receipt may also be considered to be an Extra service in and of itself. FIG. 3 shows the exemplary case of where the designation, "e/USPS RETURN RECEIPT," is printed on the label when the return receipt is to be e-mailed to the mailing party. This return receipt may serve as the same "Proof of Delivery" as specified in PS-3811 of the postal regulations.

FIG. 2 shows an example of a return receipt that may be e-mailed to the mailing party. According to this example, the return receipt is in the form of a letter from the U.S. Postal Service indicating that a mail item bearing a label with a specific item or tracking number was delivered to an address printed on the label. The letter also indicates that the item was delivered by certified First-Class mail on a specific date and at a specific time as requested by the mailing party. The letter may be attached to the e-mail as a scanned image and may include the signature of the party who received the delivery in one section and the delivery address as indicated on the label in another section. In the example of FIG. 2, the Extra services of Delivery Confirmation and Signature Confirmation were requested for confirmation. Alternatively, the substance of the letter may be included in the body of the e-mail (instead of as an attachment thereto) or the return receipt may be in the form of a return postcard.

FIGS. 3 and 4 show additional labels that may be generated in accordance with the present invention. FIG. 3 shows a label generated for sending a mail item with the combined Extra services of "Certified Mail" and "e/USPS Return Receipt." This same information is printed on the label for viewing and confirmation during the delivery process, for example, by a postal service employee. FIG. 4 shows a label generated for sending a mail item with "e/USPS Signature Confirmation." As shown in FIGS. 1, 3, and 4, the Extra services designated on these labels are further identified by the first two digits (e.g., a prefix code) of the item or tracking number, e.g., "91" or "71." With these digits listed on the label and incorporated within the bar code, the textual description of the Extra services may be considered optional.

FIG. 5 is a flow diagram showing steps included in a method for generating a mailing label in accordance with the present invention and for then delivering a mailing item using such a label. The mailing label may be any of the one shown, for example, in FIG. 1, 3, or 4. By way of example, the steps of the method may be illustrated with reference to FIGS. 6 (*a*)-6 (*d*).

Initially, a customer (e.g., the mailing party) logs onto a secure web site of a third-party company which maintains a server that stores an interactive application program for generating a label in accordance with the present invention. (Block 110). As shown in FIG. 6 (*a*), this web site may include a place for the mailing party to enter a username and password, and optionally a client code that enables the party to track expenses for billing purposes. Once this information is authenticated, the mailing party may access a function or tool (e.g., by clicking on a corresponding icon) on the web site for generating the mailing label.

Once the function or tool is activated, one or more additional web pages may be generated including the one shown in FIG. 6 (*b*). This web page displays icons corresponding to a respective number of functions offered on the site. These icons include a Create Labels icon 10, a View Delivery Information icon 20, a User Administration icon 30, a Usage Report icon 40, and a Survey Editor icon 50. The Create Labels icon allows a customer to access a page for generating a mailing label in accordance with the present invention. The View Delivery Information icon may provide status, tracking, delivery confirmation, and/or other information relating to the delivery of an item which contains a previously generated label in accordance with the present invention.

The User Administration icon may be accessed to perform various functions relating, for example, to a mailing customer account. The Usage Report icon may provide information on a customer's usage of the site to generate labels and/or to perform other services. The usage information may or may not be accompanied by account status information including, for example, a current or outstanding account balance attributed to the customer. The Survey Editor icon may be accessed to obtain survey information from customers as well as to perform other functions.

In order to generate a mailing label, a customer may select the Create Labels icon. (Block 120). Selecting this icon causes this web page shown in FIG. 6(*c*) to be generated. This web page includes a number of fields which the mailing party is required to fill out.

In the Document Type field, the customer may enter or select (e.g., from a drop-down menu) one or more Extra services (e.g., certified, certified with e/return receipt, etc.) to be designated on the label. (Block 130). In this or another field, the customer may also designate the method of delivery, which, for example, may be synonymous with the Document Type or which may indicate another type of delivery method.

In the Label Size field, the customer may designate the type of label to be generated. (Block 140). The type of label may, for example, correspond to the size of the label as well as other features relating to its physical size or appearance.

In the Number of Pages field, the customer may designate the number of pages of a document to be delivered using the label. (Block 150). A field may also be included to verify that the page count has been checked and is accurate. (Block 160).

In the Set as Default field, the customer may check a box indicating that the information in the fields shown in FIG. 6(*c*)

correspond to default information, for example, for purposes of generating future labels for the same customer. (Block 170).

Additional fields may be provided for entering the address of the recipient of the item to be mailed (Block 180), as well as other information relating to the recipient including but not limited to the recipient's company name (if applicable), e-mail address, and reference number.

In the Add to Address Book field, a box may be checked indicating that the recipient's information is to be stored in an address book corresponding to the customer's account. (Block 190). This address book will allow information corresponding to the recipient to be automatically filled into the fields under the Recipient header when selected by a customer for future label generation.

Additional fields may be provided for allowing the party to request an electronic return receipt. In accordance with the present embodiment, checking the "notification" box constitutes a request by the mailing party for Delivery Confirmation, which is one of the Extra services previously discussed. Another field may be included to allow the customer to designate the contents of the mail item, e.g., subpoena.

Once the required fields have been filled out, the mailing party may access a screen for designating the amount of postage due for the item to be mailed. This screen may include a postage calculator which generates postage, for example, based on the class of mail specified and the weight and type of item to be mailed. Alternatively, if the item to be mailed is a document, the postage may be determined based on the number of pages entered by the customer on the screen of FIG. 6 (*c*). According to another alternative, a field may be provided for allowing the mailing party to enter the amount of postage, which is externally computed. The postage calculator screen may also compute the fee(s) required for the Extra services designated by the customer. These fees may then be added to the postage with or without other costs to arrive at a total sum for delivering the item of mail.

Next, the customer may be allowed to preview a mailing label to be generated based on the entered information. (Block 200). This may be accomplished by clicking on a "Preview Label" icon. The preview feature is advantageous because it allows the customer to determine whether the label will bear accurate information. An example of a screen that may be used for previewing purposes is shown in FIG. 6 (*d*). This screen may correspond to an image version of the labels shown, for example, in FIG. 1, 3, or 4. For illustrative purposes, FIG. 6(*d*) shows an electronic image of a label with the Extra services of "Certified Mail" and "e/USPS Return Receipt."

The preview screen may further show the postage mark to be included on the label, and preferably also the amount of postage (e.g., $4.14) and fees due, the class of mail, the mailing party's zip code, as well as other information in association with the postage mark. In this example, the amount of $4.14 represents the sum of the postage required for a 1 oz. item ($0.39), the Certified Mail delivery cost ($2.40), and the cost for obtaining an electronic return receipt ($1.35).

The mailing party may click on the "Create this Label" icon to print the label after previewing (Block 210), or the preview step may be altogether skipped at the discretion of the mailing party. By selecting the "Print this Preview" icon (Block 220), a copy of the label may be printed for reference purposes (Block 250). The label and/or reference copy may be printed by a printer connected to the customer's computer. The label is then attached to or otherwise included with the item to be mailed.

The preview screen may include icons for performing other functions, including editing the label and creating a new label. When selected, the "Edit this Label" icon may allow the customer to return to the screen shown in FIG. 6(*c*) in order to make changes therein.

In accordance with an alternative and especially advantageous embodiment, information that otherwise would be contained on the label (e.g., as previewed) may be printed directly onto an envelope inserted into the printer. The envelope may be a standard # 10 envelope, a 6"×9" envelope, or an envelope of a different size, or according to another embodiment the information may be printed directly on a plain-paper insert at a position which is visible through a window of the envelope. This direct-printing embodiment will alleviate the need for labels altogether, thereby streamlining the process and advantageously reducing costs.

Figure 7A:
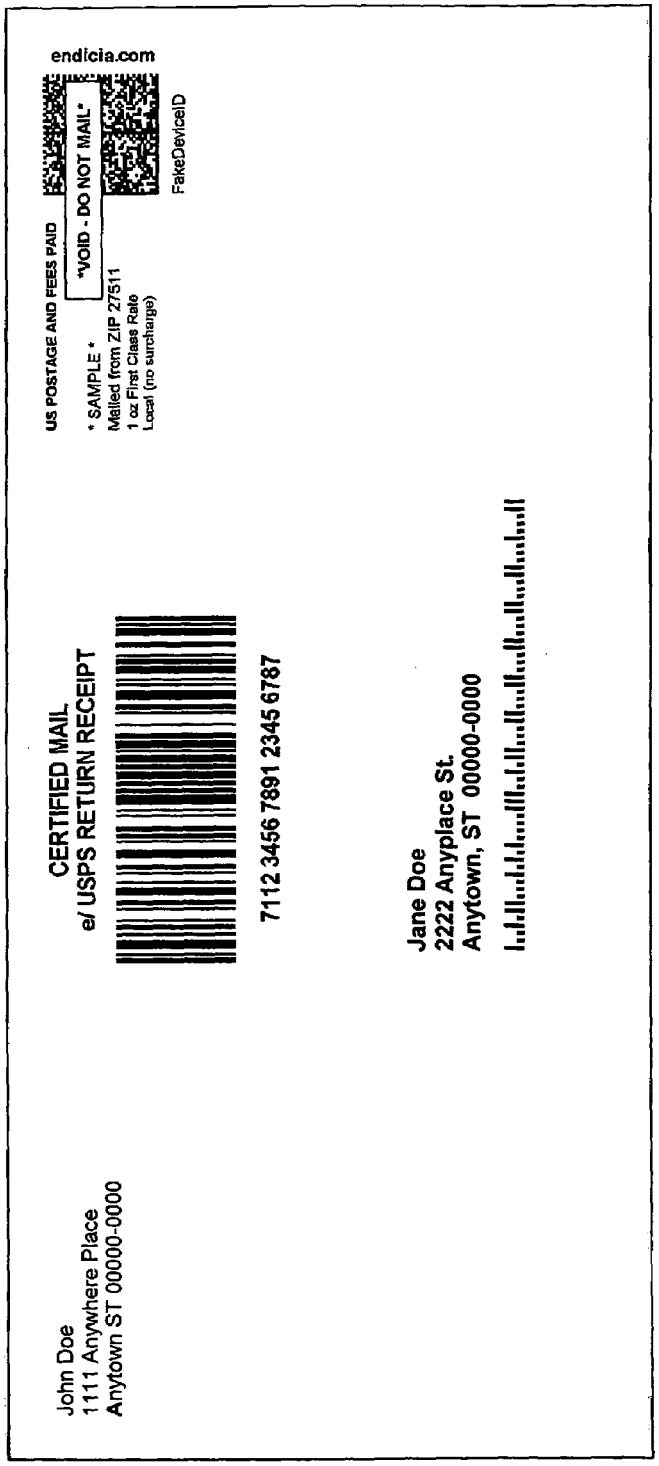
FIGS. 7(a)-7(c) show examples of how label information may be printed in accordance with direct-printing embodiments of the present invention.
Figure 7B:
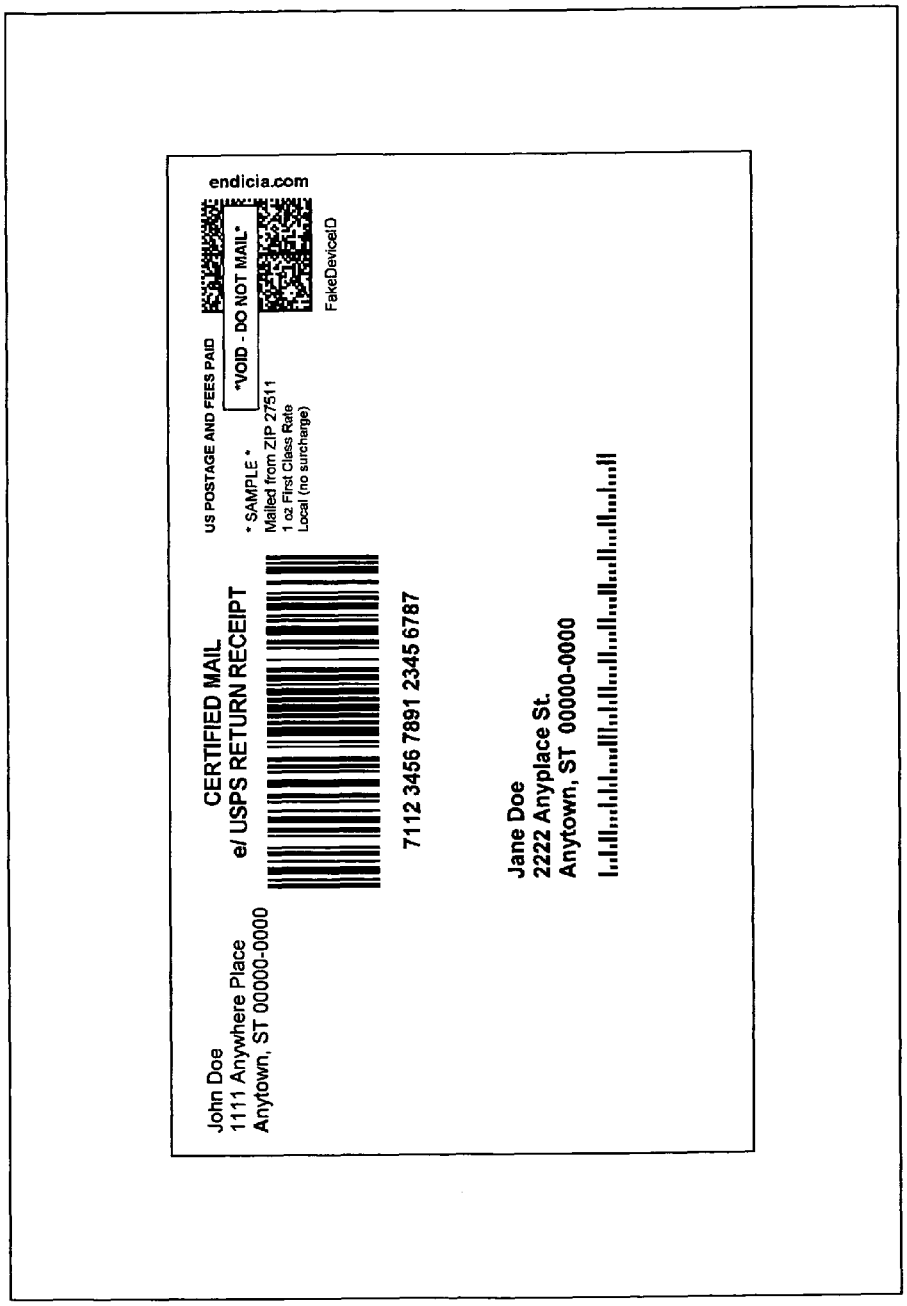
Figure 7C:
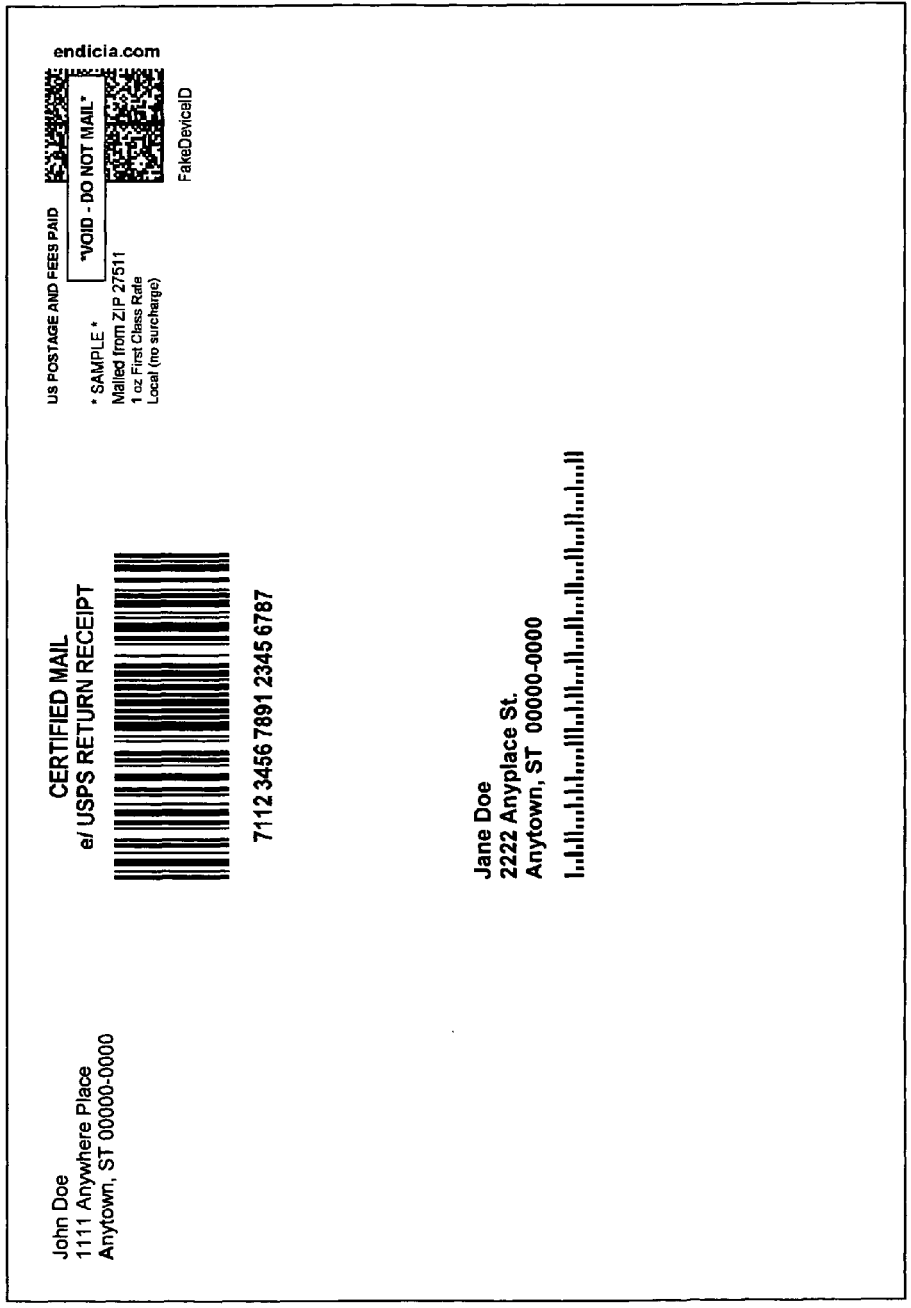

FIG. 7(*a*) shows an example of a #10 envelope which has been directly printed with the label information contained in a preview screen generated according to the present invention. As shown, the positioning of the information that would otherwise be included on a label is changed to correspond to specific areas of the envelope. While the Extra services specified on this envelope include Certified Mail e/USPS Return Receipt, those skilled in the art can appreciate that any one or more of the Extra services previously identified may be directly printed on the envelope.

FIG. 7(*b*) shows an example of a 4"×7" plain-paper insert which has been directly printed with the information contained in a preview screen generated according to the present invention. The plain-paper insert is to be positioned within an envelope so that it is visible through an envelope window. An envelope containing such a window and plain-paper insert may also be a booklet envelope.

FIG. 7(*c*) shows an example of a 6"×9" booklet envelope which has been directly printed with the information contained in a preview screen generated according to the present invention. The information printed on this envelope designates the Extra services of Electronic Certified Mail with e/USPS Return Receipt.

Returning to FIG. 5, once the label is printed out or the direct-printing step is completed, an electronic image of the label or information contained in the label is transmitted to a label server. (Block 230). The label server then sends an electronic data transmission is sent to a server of the U.S. Postal Service. (Block 240). The label may be printed after, before, or simultaneously with the functions performed in Blocks 230 and 240. (Block 250). An electronic record of the printed label is then stored on the website in association with the customer's account. (Block 260).

The electronic data transmission sent in Block 240 includes information identifying the item or tracking number associated with the item to be mailed. This information may correspond to an image of the label or an image of the front of an envelope or plain-paper insert generated in accordance with the direct-printing embodiment, or the information may identify the item or tracking number in textual form along with an indication of what Extra services are being requested. The transmission may also be accompanied by payment information, which, for example, may include an instruction for the total sum printed on the label (e.g., postage and fees) to be debited to a predetermined account.

If a third-party is sending the transmission (and not the mailing party himself, which is possible according to another embodiment when an application program running on the party's home or business computer), the third-party will be reimbursed by the mailing party at a later time. The reimbursement may be obtained prospectively, for example, by having the mailing party enter credit card or other payment information on a screen (not shown) prior to the direct-printing or label-printing step. Alternatively, the third-party may debit an account of the mailing party along with a service fee. The collection of the third-party's service fee, thus, provides a new stream of revenue for companies not heretofore known in the industry.

The transmission sent by the third party may also be accompanied by a "fees paid at mailing" designation for the return receipt. This will permit the return receipt (electronic) proof of delivery to be delivered directly to the third-party provider system via the U.S. Postal Service.

As a result of the electronic data transmission sent in Block 240, the U.S. Postal Service computer system will have a record of the mailing item. When the item is received, postal employees will be able to access the record on their own computer system (e.g., by scanning the certified mail or tracking number) and then perform delivery of the item according to the type(s) of Extra service(s) requested. Alternatively, a post office may receive the item to be mailed, for example, from the mailing party directly during a visit, from mail collected from a mail box, or from a courier hired by the mailing party. The item will then be delivered based on the information on the label or the label information visible from the front portion of the envelope.

According to an alternative embodiment, postal employees may deliver the item without ever having received a transmission. Under these circumstances, the Extra service status of the item may be ascertained based on the identification information (e.g., descriptive of encoded) printed on the item or item's label.

At the time of delivery, the mail recipient may be required to fill out a delivery confirmation and/or signature confirmation form such as shown in FIG. 2. A record of this confirmation may then be electronically transmitted to the mailing party in fulfillment of his request to receive a return receipt.

Figure 8:
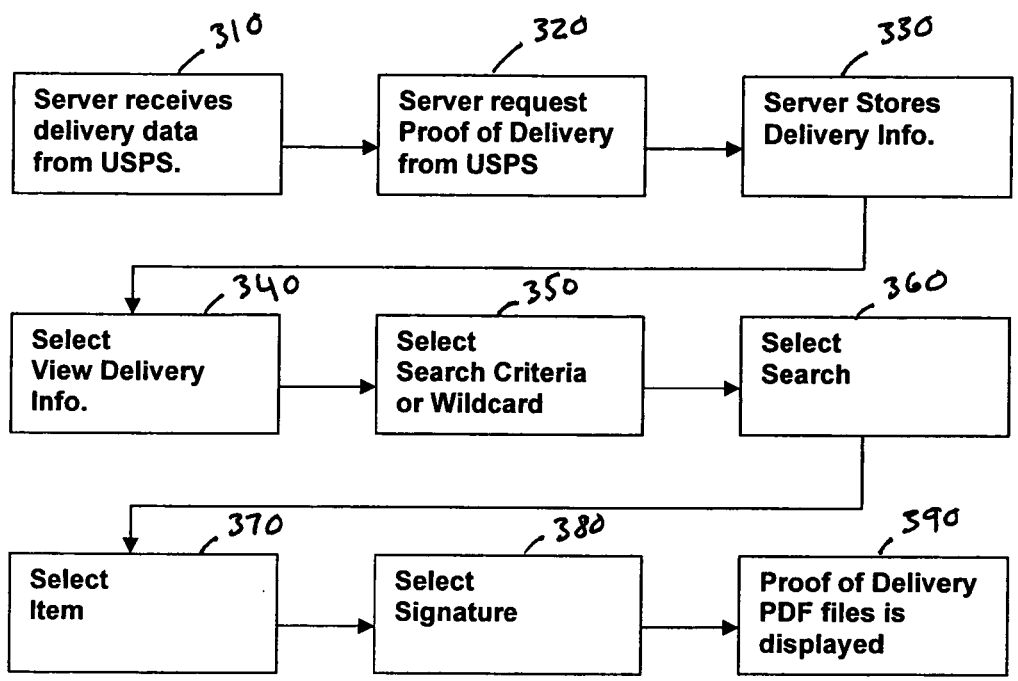
FIG. 8 is a diagram showing steps included in a method for retrieving proof of delivery information in accordance with one embodiment of the present invention.

More specifically, as shown in FIG. 8, the label server maintained by the third-party provider will receive delivery data from the U.S. postal service. (Block 310). The label server may then request proof of delivery from the U.S. Postal Service, for example, through another electronic transmission. (Block 320). The server will then store this information in association with the customer's account. (Block 330). The customer may then select the View Delivery Information icon shown in FIG. 6(*b*) to confirm that the mailing item has been delivered in accordance with the Extra services requested. (Block 340).

In accessing the delivery confirmation information, the customer may select a search criteria or wild card option contained on a screen generated when the View Delivery icon is selected. (Block 350). This screen may, for example, allow the customer to enter the identification (item or tracking) number printed on the label included with the mailed item. The search may then be performed based on the entered search criteria (Block 360), and a corresponding record produced by the search may be selected for viewing (Block 370). When the record is selected, the customer may make a selection to view the signature confirmation such as shown by the image in FIG. 2 (Block 380), and proof of delivery may then be displayed, for example, as .pdf format files (Block 390).

The return receipt may be included in the information transmitted from the U.S. Postal Service to the third-party provider website. The provider may then transmit the return receipt to the mailing party via e-mail, and/or the return receipt may be made available to the mailing party by logging onto the provider's web-site as previously described. An electronic return receipt may be stored in the customer's secure account in the third-party computer system for archival purposes.

In an optional step of the method, the addressee's address as entered by the mailing party may be automatically validated during the label generation process. This may be accomplished, for example, by programming the control software of the label-generation program to access a database of the U.S. Postal Service. The last four digits of the addressee's zip code may then automatically be added to generation of the label when a match is found by the database search.

Also, an additional screen may be added to allow the web site provider to charge its own private fees for generating the label or directly printed envelope. These fees may be charged on a periodic or per-use basis at the discretion of the provider.

The method may be performed using an interactive program running, for example, on the computer of a postal customer (e.g., a business or individual) or on the computer of a U.S. Post Office employee who receives an item to be mailed from the mailing party.

In accordance with another embodiment, the present invention is a data processing system which generates a mailing label in accordance with any of the foregoing embodiments. The system may include a computer running an application program which is stored, for example, on a server of a third-party interactive website such as previously discussed. The application program may implement the steps of the method of the present invention. Alternatively, the system may be a stand-alone computer system running application software that generates a label as previously described in a home or office setting.

The present invention is therefore advantageous in several exemplary respects. First, the invention provides for the generation of a label (or alternatively a directly printed envelope/plain paper) that has both a U.S. Postal Service Certified Mail designation with First-Class Postage and Extra service status. Second, the invention provides for a return receipt confirmation that the Extra service(s) requested have been performed, which receipt may be electronically transmitted to the mailing party by accessing a web site account or by e-mail. Third, at least one embodiment of the invention provides for the printing of the aforementioned information directly on an envelope, without using a label. This streamlines the process and is more convenient for the customer. It also saves the customer time and money by avoiding having to pay for specially sized labels that are compatible with certain printer specifications.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

I claim:

1. A non-transitory computer-readable medium having computer-readable instructions stored therein which, when executed by a processor, causing the processor to print a label for use with mailing letters, the label comprising:

a postage mark indicative of a mailing rate that corresponds to a type of First Class Mail that excludes shipping services;

(a) information designating that an item to be sent with the label is to be delivered with Extra service status;

(b) information designating that the item is less than 13 ounces and is to be delivered by the U.S. Postal Service using a type of First Class Mail that excludes shipping services;

(c) information designating that the label was electronically generated by a third-party private business, said information designating that the label was electronically generated by the third-party business different from a mailing party and including at least one of a name or address of the third-party business to which information is to be sent from the U.S. Postal Service to a server of the third-party business to confirm performance of the Extra service,
(d) a first symbol indicating that confirmation of performance of the Extra service, including a return receipt, is to be sent electronically;
(e) a second symbol indicating the type of First Class Mail that excludes shipping services to be used in delivering the item; and
(f) a zip code number indicating a location from where the item is to be mailed; and
(g) a mailing zone symbol corresponding to delivery of the item, wherein the mailing zone symbol is different from the zip code number.

2. The non-transitory computer-readable medium of claim 1, wherein said Extra service status information includes a prefix code embedded in an identification number assigned to the label.

3. The non-transitory computer-readable medium of claim 2, wherein said Extra service status information indicates that the item is being delivered as Certified Mail with an electronic Return Receipt requested.

4. The non-transitory computer-readable medium of claim 3, wherein said label further includes information indicative of a sum of money, said sum including a postage value corresponding to said postage mark and an Extra service delivery fee.

5. The non-transitory computer-readable medium of claim 4, wherein said instructions causing the processor to print the label on a letter-sized envelope.

6. The non-transitory computer-readable medium of claim 5, wherein the letter-sized envelope is a number 10 envelope.

7. The non-transitory computer-readable medium of claim 4, wherein said instructions causing the processor to print the label on a plain paper insert, the label printed at a position that corresponds to a window of an envelope.

8. The non-transitory computer-readable medium of claim 5, wherein the label is printed at a position which corresponds to a window of a 6"×9" envelope.

9. The non-transitory computer-readable medium of claim 1, wherein the second symbol is one of a plurality of predetermined numbers, each of said predetermined numbers corresponding to a different class of mail.

10. The non-transitory computer-readable medium of claim 1, wherein the information in (c) is located below the information in (b) on the label and wherein the second symbol, the zip code number in (f), and the mailing zone symbol in (g) are located above the information in (b).

\* \* \* \* \*

UNITED STATES PATENT AND TRADEMARK OFFICE
Certificate

Patent No. 7,840,499 B2                                            Patented: November 23, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Charles Westray Crutchfield, Cary, NC (US); and Amine Khechfe, Cupertino, CA (US).

Signed and Sealed this Eleventh Day of November 2014.

JOHN W. HAYES
*Supervisory Patent Examiner*
Art Unit 3628
Technology Center 3600